(12) United States Patent
Kennedy, III et al.

(10) Patent No.: US 7,192,368 B2
(45) Date of Patent: Mar. 20, 2007

(54) GOLF BALL COVERS AND MANTLES COMPRISING GLASS PARTICLES

(75) Inventors: Thomas J. Kennedy, III, Wilbraham, MA (US); Mark L. Binette, Ludlow, MA (US)

(73) Assignee: Callaway Golf Company, Carlsbad, CA (US)

( * ) Notice: Subject to any disclaimer, the term of this patent is extended or adjusted under 35 U.S.C. 154(b) by 143 days.

(21) Appl. No.: 11/147,866

(22) Filed: Jun. 7, 2005

(65) Prior Publication Data

US 2006/0276264 A1  Dec. 7, 2006

(51) Int. Cl.
*A63B 37/06* (2006.01)

(52) U.S. Cl. ........................................ 473/374

(58) Field of Classification Search ........... 473/378, 473/373, 374
See application file for complete search history.

(56) References Cited

U.S. PATENT DOCUMENTS

| | | | |
|---|---|---|---|
| 5,567,772 A | 10/1996 | Hagman et al. | |
| 5,803,831 A | 9/1998 | Sullivan et al. | |
| 5,820,489 A | 10/1998 | Sullivan et al. | |
| 5,973,046 A | 10/1999 | Chen et al. | |
| 5,984,806 A | 11/1999 | Sullivan et al. | |
| 6,012,991 A * | 1/2000 | Kim et al. | 473/374 |
| 6,100,321 A | 8/2000 | Chen | |
| 6,150,470 A | 11/2000 | Sullivan | |
| 6,213,894 B1 * | 4/2001 | Sullivan et al. | 473/374 |
| 6,261,193 B1 * | 7/2001 | Sullivan et al. | 473/377 |
| 6,653,382 B1 | 11/2003 | Statz et al. | |
| 6,777,472 B1 | 8/2004 | Statz et al. | |
| 6,837,805 B2 | 1/2005 | Binette et al. | |
| 6,846,248 B2 | 1/2005 | Nesbitt | |
| 6,945,878 B2 | 9/2005 | Binette et al. | |
| 6,964,622 B1 | 11/2005 | Dewanjee | |
| 6,994,638 B2 | 2/2006 | Rajagopalan et al. | |
| 2004/0063517 A1 * | 4/2004 | Binette et al. | 473/361 |
| 2004/0097302 A1 * | 5/2004 | Isogawa et al. | 473/378 |

* cited by examiner

*Primary Examiner*—Raeann Trimiew
(74) *Attorney, Agent, or Firm*—Michael A. Catania; Elaine H. Lo

(57) ABSTRACT

Disclosed herein is a golf ball with a mantle or cover layer formed from a composition comprising glass particles. More specifically, the golf ball has a mantle and/or cover that contains a combination of glass particles and an ionomeric component or a non-ionomeric component.

5 Claims, 1 Drawing Sheet

GOLF BALL COVERS AND MANTLES COMPRISING GLASS PARTICLES

CROSS REFERENCES

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to golf ball covers and mantles comprising glass particles, preferably surface treated glass particles.

2. Description of the Related Art

Modern golf balls typically employ ionomeric resins or polyurethanes as cover materials. Ionomeric resins, as a result of their toughness, durability, and wide range of hardness values, have become materials of choice for golf ball covers over traditional rubbers. Ionomeric resins generally comprise an alpha-olefin and an alpha, beta-ethylenically unsaturated mono- or dicarboxylic acid neutralized with metal ions to the extent desired. Olefins which have been employed to prepare ionomeric resins include ethylene, propylene, butene-1 and the like. Unsaturated carboxylic acids which have been employed to prepare ionomeric resins include acrylic, methacrylic, ethacrylic, o-chloroacrylic, crotonic, maleic, fumaric, itaconic and the like. Ionomeric resins include copolymers of ethylene with acrylic acid such as those sold by Exxon Corporation under the trademark "IOTEK", as well as copolymers of ethylene with methacrylic acid such as those sold by E.I. DuPont Nemours & Company under the trademark "SURLYN". In some instances, a softening comonomer such as an acrylate ester has been included such that the ionomeric copolymer is an ionomeric terpolymer. Although various compositions have been employed to provide golf balls of varying playability characteristics, a need continues for compositions and covers which can be employed to provide golf balls that exhibit good playability and durability.

There are no commercially available golf balls that are generally known to contain surface treated glass particles or materials. The glass particles may be used in a golf ball cover or cover layers, in the mantle, or both, to reinforce the golf ball cover layer(s) and/or mantle layer. U.S. Pat. No. 6,193,617 discloses golf balls with an outer cover comprising hard particles such as diamond particles, and a predetermined number of the hard particles protrude from the outer surface of the outer cover. However, there is no indication in the patent that surface treated glass particles can be used in a golf ball cover or mantle layer.

In view of known strength and durability properties of glass and glass particles, it would be desirable to utilize glass particles in the construction of a golf ball. Specifically, it would be desirable to use surface treated glass particles in a golf ball cover and/or mantle layer. There is a particular need for improved golf ball cover and mantle materials, particularly golf balls with increased compression and coefficient of restitution as well as improved durability with the same or higher coefficient of restitution.

BRIEF SUMMARY OF THE INVENTION

An object of the invention is to provide a highly durable golf ball. Another object of the invention is to provide a golf ball with a cover or mantle layer comprising surface treated glass particles.

A further object of the invention is to provide a golf ball wherein the coefficient of restitution and compression is maintained or increased.

Other objects of the invention will be in part obvious and in part pointed out more in detail hereinafter.

A preferred embodiment is a golf ball having a core and at least one cover layer disposed about said core. The cover layer includes surface treated glass particles.

Another preferred embodiment is a golf ball having a cover and a core centrally disposed within said cover. The cover includes a combination of at least a first component and a second component. The first component comprises surface treated glass particles. The second component comprises an ionomer or blend of ionomers, a non-ionomer or blend of non-ionomers, or a blend of ionomer and non-ionomer. Preferably, the golf ball has a coefficient of restitution of at least 0.770.

The invention comprises the several steps and the relation of one or more such steps with respect to each of the others, and the article possessing the features, properties and the relation of elements exemplified in the following detailed disclosure.

DETAILED DESCRIPTION OF THE INVENTION

Figure 1:
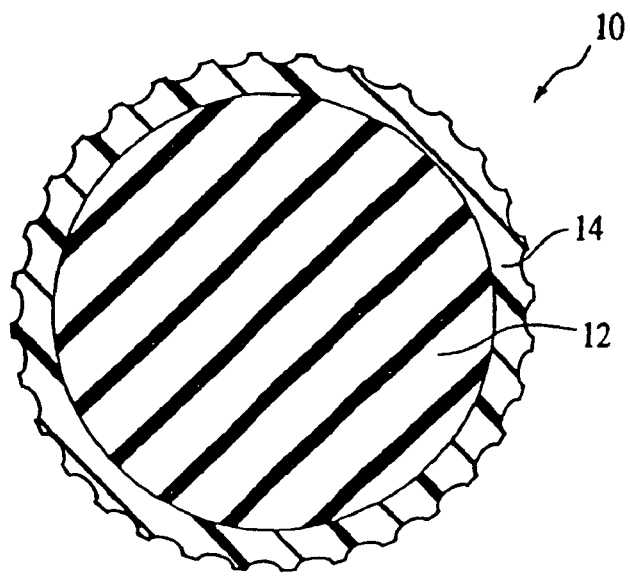
FIG. 1 shows a cross-sectional view of a golf ball with a cover comprising surface treated glass particles.

The invention in a preferred form is a golf ball having at least one cover layer with a resin composition comprising a combination of surface treated glass particles and an ionomeric or non-ionomeric component, the content of the glass particles being from about 0.5 to about 40 weight percent, preferably from about 1 to about 15 weight percent, and more preferably from about 2 to about 10 weight percent of the resin composition, the golf ball having a coefficient of restitution of at least 0.770. The glass particles are preferably surface treated with a silane, such as, for example, vinylsilane, acrylsilane, aminosilane, epoxysilane or a combination thereof, although any other treatment known in the art may be utilized if desired. The glass particles may be flakes, fibers or micro-particles. These particles may also be coated with a metal coating that is, for example, deposited by vacuum metallization or sputtering. Glass flakes preferably have a thickness of about 5±2 microns and a width of about 10 to about 4000 microns, and glass fibers preferably have a diameter of about 13 microns or less, and a length of about 35 to about 70 microns. Other glass particles, such as nanoparticles of less than one micron may also be used in addition to the glass particles previously described.

An alternative form of the present invention golf ball comprises a golf ball having a core, a mantle layer and at least one cover layer wherein the mantle layer comprises glass particles. The cover layer or layers may also comprise glass particles.

The ionomeric component of the invention preferably is a copolymer formed from an alpha-olefin having 2 to 8 carbon atoms and an acid which is selected from the group consisting of alpha, beta-ethylenically unsaturated mono- or dicarboxylic acids and is neutralized with cations which include at least one member selected from the group consisting of zinc, lithium, sodium, manganese, calcium, chromium, nickel, aluminum, potassium, barium, tin, copper, and magnesium ions. Preferred cations are zinc, sodium, lithium, and magnesium, and combinations thereof. In one preferred embodiment, the copolymer is further formed from an unsaturated monomer of the acrylate ester class having from 3 to 21 carbon atoms.

The non-ionomeric resin may be any non-ionomeric material known in the art, as further described herein.

The present invention relates to golf balls which employ constructions containing glass particles, preferably in the mantle and/or inner and/or outer cover compositions of golf balls having a core and one, two, or more cover layers formed thereon. Some non-limiting examples of compositions according to the invention are as follows:

(1) mixture of glass particles and an ionomeric resin;

(2) mixture of glass particles and a terpolymer;

(3) mixture of glass particles and at least one non-ionomeric resin;

(4) mixture of glass particles and at least one non-ionomeric resin and at least one ionomeric resin;

(5) mixtures of glass particles and a thermoplastic or thermoset polyurethane;

(6) mixtures of glass particles and a reaction injection polyurethane, polyurethane/polyurea or a polyurea.

The golf balls of the invention preferably have a coefficient of restitution of at least 0.770 and PGA compression of at least 60, preferably at least 80.

An "ionomeric copolymer" as this term is used herein is a copolymer of an alpha-olefin and an alpha, beta-ethylenically unsaturated mono- or dicarboxylic acid with at least 3% of the carboxylic acid groups being neutralized with metal ions. The alpha-olefin preferably has 2 to 8 carbon atoms, the carboxylic acid preferably is acrylic acid, methacrylic acid, maleic acid, or the like and the metal ions include at least one cation selected from the group consisting of ions of zinc, magnesium, lithium, barium, potassium, calcium, manganese, nickel, chromium, tin, aluminum, sodium, copper, or the like. Preferably the cation is zinc, sodium, lithium, or magnesium, or a combination thereof. The term "copolymer" includes (1) copolymers having two types of monomers which are polymerized together, (2) terpolymers (which are formed by the polymerization of three types of monomers), and (3) copolymers which are formed by the polymerization of more than three types of monomers.

An "ionomeric component", as used herein, is an ionomeric copolymer which does not contain glass particles and which is capable of being mixed or blended with the glass particles.

A "polyurethane", as used herein, is any type of polyurethane and/or polyurethane/polyurea material, such as a thermoplastic polyurethane, a cast polyurethane, a reaction injection molded polyurethane, and the like.

In a first embodiment, golf balls of the invention employ, preferably as a mantle layer and/or cover layer, a composition that is a mixture of glass particles and an ionomeric resin or blend of ionomeric resins. The glass particles are preferably surface treated with a silane coupling agent. The glass particles preferably comprise about 0.5 to about 40 weight percent of the mixture, and the ionomeric copolymer is about 60 to about 99.5 weight percent of the mixture.

Glass particles, such as glass flakes, have been used with a variety of materials to improve properties such as dimensional stability, impact strength, chemical resistance, wear resistance, and surface finish, and to reduce warpage and water/fluid absorption. Examples of commercially available glass particles are Microglas® Glass Flake and Microglas Fleka®, available from Nippon Glass Fiber Co. Ltd, Canada, and crushed and powdered Corning glass available from Elan Technology, Midway Ga. Other possible benefits, particularly when used in a mantle and/or cover layer of a golf ball include, but are not limited to, improved durability; higher or harder compression; improved barrier properties; reduced water or moisture permeability; and higher toughness.

Ionomeric copolymers which may be used in the mixture include ionomeric copolymers of an alpha olefin of the formula $RCH=CH_2$ where R is H or alkyl radicals having 1 to 8 carbons, and an alpha, beta-ethylenically unsaturated carboxylic acid having from 3 to 8 carbons. The ionomeric copolymer has at least about 10 weight percent of the COOH groups neutralized with metal cations, preferably zinc, sodium, lithium, magnesium, and the like.

Olefin/carboxylic acid copolymer ionomers which may be employed include those wherein the carboxylic acid groups of the copolymer ionomer are partially (for example, approximately 5 to 80 percent) neutralized by metal ions such as but not limited to lithium, sodium, zinc and magnesium, preferably zinc and sodium. Ionic copolymers may be zinc neutralized ethylene/methacrylic acid ionomer copolymer, sodium neutralized ethylene/acrylic acid copolymer ionomers, and mixtures thereof. The zinc neutralized ethylene/acrylic acid copolymer ionomer can be the reaction product of zinc neutralization of an ethylene/acrylic acid copolymer having about 15 to 20 weight percent acrylic acid and a melt index of about 37 to about 100. These copolymer ionomers usually have a relatively high molecular weight (for example, a melt index of about 0.1 to 1000 g/10 min., and/or a weight average molecular weight of 5000 up to one million). Useful copolymer ionomers include, for example, ethylene/acrylic acid copolymer ionomers sold by Exxon Chemical Co. under the designation "IOTEK®" such as IOTEK® 7030, IOTEK® 7020, IOTEK® 7010, IOTEK® 8030, IOTEK® 8020, and IOTEK® 8000. Non-limiting examples of preferred IOTEK® copolymer ionomers for use in the invention include IOTEK® 7010, IOTEK® 7030 and IOTEK® 8000.

In another embodiment, golf balls of the invention employ preferably as a cover, a composition that includes a mixture of a copolymer of polyphenylene oxide and polypropylene and a terpolymer. Terpolymers which may be employed include olefin/alkyl acrylate/carboxylic acid terpolymers or olefin/alkyl(meth)acrylate/carboxylic acid terpolymers. Typically, the carboxylic acid groups of the terpolymer ionomer are partially (for example, approximately 5 to 80 percent) neutralized by metal ions such as lithium, sodium, zinc, manganese, nickel, barium, tin, calcium, magnesium, copper and the like, preferably zinc, sodium, lithium, or magnesium, or a combination thereof, most preferably zinc or lithium or a combination thereof. These terpolymer ionomers usually have a relatively high molecular weight, e.g., a melt index of about 0.1 to 1000 g/10 min., and/or a weight average molecular weight of 5000 up to one million. These terpolymers typically have about 50 to 98 weight percent olefin, about 1 to 30 weight percent alkyl acrylate, and about 1 to 20 weight percent carboxylic acid.

The olefin may be any of ethylene, propylene, butene-1, hexene-1 and the like, preferably ethylene. The alkyl (meth) acrylate may be any of methyl acrylate, methyl methacrylate, ethyl acrylate, ethyl methacrylate, butyl acrylate, butyl methacrylate, butyl vinyl ether, methyl vinyl ether, and the like, preferably methyl acrylate. The carboxylic acid may be any one of acrylic acid, methacrylic acid, maleic acid, and fumaric acid. Monoesters of diacids such as methyl hydrogen maleate, methyl hydrogen fumarate, ethyl hydrogen fumarate, and maleic anhydride which is considered to be a carboxylic acid may also be used. Preferably, the carboxylic acid is acrylic acid. Useful ethylene/methyl acrylate/acrylic acid terpolymers may comprise about 50 to 98 weight percent, preferably about 65 to 85 weight percent, most preferably about 76 weight percent ethylene, about 1 to 30 weight percent, preferably 15 to 20 weight percent, most preferably about 18 weight percent methyl acrylate, and about 1 to 20 weight percent, preferably about 4 to 10 weight percent, most preferably about 6 weight percent acrylic acid.

Olefin/alkyl(meth)acrylate/carboxylic acid terpolymers which are preferred for use in the compositions employed in the invention are ethylene/methyl acrylate/acrylic acid terpolymers such as those marketed by Exxon Chemical Co. under the name ESCOR®. Examples of these terpolymers include ESCOR® ATX 320 and ESCOR® ATX 325.

Other olefin/alkyl (meth)acrylate/carboxylic acid terpolymers which may be employed in the compositions employed in the invention include but are not limited to: ethylene/n-butyl acrylate/acrylic acid, ethylene/n-butyl acrylate/methacrylic acid, ethylene/2-ethoxyethyl acrylate/acrylic acid, ethylene/2-ethoxyethyl acrylate/methacrylic acid, ethylene/n-pentyl acrylate/acrylic acid, ethylene/n-pentyl acrylate/methacrylic acid, ethylene/n-octyl acrylate/acrylic acid, ethylene/2-ethyhexyl acrylate/acrylic acid, ethylene/n-propyl acrylate/acrylic acid, ethylene/n-propyl acrylate/methacrylic acid, ethylene/n-heptyl acrylate/acrylic acid, ethylene/2-methoxyethyl acrylate/acrylic acid, ethylene/3-methoxypropyl acrylate/acrylic acid, ethylene/3-ethoxypropyl acrylate/acrylic acid, and ethylene/acrylate/acrylic acid. Compositions which may be employed to provide golf balls according to this embodiment of the invention include about 0.5 to about 25 weight percent glass particles and about 75 weight percent to about 95 weight percent terpolymer or blend of terpolymers.

Other useful terpolymer ionomers include, for example, ethylene/methyl acrylate/acrylic acid terpolymer ionomers sold by Exxon Chemical Co. under the designation "IOTEK®". Preferred terpolymer ionomers for use in the invention include zinc neutralized ethylene/methyl acrylate/acrylic acid terpolymer ionomers such as IOTEK® 7520 and IOTEK® 7510.

Other terpolymer ionomers which may be used in the compositions employed in this embodiment of the invention include terpolymer ionomers such as those disclosed in U.S. Pat. No. 4,690,981, the teachings of which are incorporated by reference in its entirety herein, and which are available from DuPont Corp. under the trade name SURLYN®.

In another embodiment, golf balls of the invention employ, preferably as a mantle or cover layer, compositions which include a mixture of glass particles and at least one non-ionomeric resin. Examples of non-ionomeric resins suitable for use in the present invention include a non-ionomeric thermoplastic or thermosetting material such as, but not limited to, a metallocene catalyzed polyolefin such as EXACT® material available from EXXON and ENGAGE® material available from Dow Chem. Co., a thermoplastic or thermoset polyurethane such TEXIN® thermoplastic polyurethanes from Bayer Co. and the PEL-LATHANE® thermoplastic polyurethanes from Dow Chemical Co., ionomer/rubber blends such as those in U.S. Pat. Nos. 4,986,545; 5,098,105 and 5,187,013, thermoplastic block polyesters, e.g., a polyester elastomer such as that marketed by DuPont under the trademark HYTREL®, thermoplastic block polyamides, such as a polyether amide such as that marketed by Elf Atochem S.A. under the trademark PEBAX®, acrylate copolymers such a those marketed by DuPont under the trademark ELVALOY® AC, a polyamide (blend of nylon and ionomer) such as that marketed by Allied Signal Plastics under the trademark CAPRON®, a Nylon 66 modified molding compound containing ionomer such as that marketed by DuPont under the trademark ZYTEL® 408, a polycarbonate such as that marketed by General Electric under the trademark LEXAN®, styrene-butadiene-styrene block copolymers, including functionalized styrene-butadiene-styrene block copolymers, styrene-ethylene-butadiene-styrene (SEBS) block copolymers such as KRATON® materials from Shell Chem. Co., including functionalized SEBS block copolymers, or a blend of two or more non-ionomeric thermoplastic or thermosetting materials. The composition may also include an ionomeric resin or a terpolymer, in addition to the non-ionomeric resin.

Polyurethanes may also be used in the mantle and/or cover compositions with the glass flakes. Polyurethanes are polymers which are used to form a broad range of products. They are generally formed by mixing two primary ingredients during processing. For the most commonly used polyurethanes, the two primary ingredients are a polyisocyanate (for example, diphenyl methane diisocyanate monomer ("MDI"), hexamethylene diisocyanate ("HDI") and toluene diisocyanate ("TDI") and their derivatives) and a polyol (for example, a polyester polyol or a polyether polyol). Any suitable polyurethane material may be used, depending on the properties desired.

A wide range of combinations of polyisocyanates and polyols, as well as other ingredients, are available. Furthermore, the end-use properties of polyurethanes can be controlled by the type of polyurethane utilized, for example, whether the material is thermoset (crosslinked molecular structure) or thermoplastic (linear molecular structure).

Crosslinking occurs between the isocyanate groups (—NCO) and the polyol's hydroxyl end-groups (—OH). Additionally, the end-use characteristics of polyurethanes can also be controlled by different types of reactive chemicals and processing parameters. For example, catalysts are utilized to control polymerization rates. Depending upon the processing method, reaction rates can be very quick (as in the case for some reaction injection molding systems ("RIM") or may be on the order of several hours or longer (as in several coating systems). Consequently, a great variety of polyurethanes are suitable for different end-users. A non-limiting example of a suitable polyurethane is ESTANE® polyurethane commercially available from Noveon, Inc.

The physical properties of thermoset polyurethanes are controlled substantially by the degree of crosslinking. Tightly crosslinked polyurethanes are fairly rigid and strong. A lower amount of crosslinking results in materials that are flexible and resilient. Thermoplastic polyurethanes have some crosslinking, but purely by physical means. The crosslinking bonds can be reversibly broken by increasing temperature, as occurs during molding or extrusion. In this regard, thermoplastic polyurethanes can be injection molded, and extruded as sheet and blow film. They can be used up to about 350° F. and are available in a wide range of hardnesses.

Polyurethane materials suitable for the present invention are formed by the reaction of a polyisocyanate, a polyol, and optionally one or more chain extending diols. The polyisocyanate is selected from the group including diphenyl methane diisocyanate ("MDI"); toluene diisocyanate ("TDI"); xylene diisocyanate ("XDI"); methylene bis-(4-cyclohexyl isocyanate) ("HMDI"); hexamethylene diisocyanate ("HDI"); and naphthalene-1,5,-diisocyanate ("NDI").

One polyurethane component which can be used in the present invention incorporates TMXDI ("META") aliphatic isocyanate (Cytec Industries, West Paterson, N.J.). Polyurethanes based on meta-tetramethylxylylene diisocyanate can provide improved gloss retention UV light stability, thermal stability, and hydrolytic stability. Additionally, TMXDI aliphatic isocyanate has demonstrated favorable toxicological properties. Furthermore, because it has a low viscosity, it is usable with a wider range of diols (to polyurethane) and diamines (to polyureas). If TMXDI is used, it typically, but not necessarily, is added as a direct replacement for some or all of the other aliphatic isocyanates in accordance with the suggestions of the supplier. Because of slow reactivity of TMXDI, it may be useful or necessary to use catalysts to have practical demolding times. Hardness, tensile strength and elongation can be adjusted by adding further materials in accordance with the supplier's instructions.

Further examples of suitable polyurethanes include polyurethane systems formed via reaction injection molding (RIM). RIM processing to form various layers of a golf ball is described in detail in U.S. Pat. No. 6,290,614, incorporated herein by reference.

Non-limiting examples of suitable RIM systems for use in the present invention are BAYFLEX® elastomeric polyurethane RIM systems, BAYDUR® GS solid polyurethane RIM systems, PRISM® solid polyurethane RIM systems, all from Bayer Corporation (Pittsburgh, Pa.), SPECTRIM® reaction moldable polyurethane and polyurea systems from Dow Chemical USA (Midland, Mich.), including SPECTRIM® MM 373-A (isocyanate) and 373-B (polyol), ELASTOLIT® SR systems from BASF® (Parsippany, N.J.), and VIBRARIM® systems from Uniroyal Corporation. Further preferred examples are polyols, polyamines and isocyanates formed by processes for recycling polyurethanes and polyureas. Peroxides, such as MEK-peroxide and dicumyl peroxide can be used. Furthermore, catalysts or activators, such as for example, cobalt octoate 6% can be used.

Moreover, in alternative embodiments, the mantle or cover layer formulation may also comprise a soft, low modulus non-ionomeric thermoplastic elastomer including a polyester polyurethane such as ESTANE® polyester polyurethane, commercially available from Noveon, Inc.

Two or more ionomers may be preblended prior to blending with the glass particles, or they may all be blended together, to provide compositions that may be used in the invention, depending on the properties desired. Thus, preblends of hard and soft copolymer ionomers, as well as preblends of high carboxylic acid copolymer ionomers and low carboxylic acid copolymer ionomers may be utilized to provide compositions for use in the invention. An example of such a preblend is a mixture of IOTEK® 8000 and IOTEK® 7010.

Two or more terpolymers may be preblended prior to blending with any of PPO/PP copolymer to provide compositions that may be used in the invention. Thus, preblends of hard and soft terpolymers, as well as preblends of high carboxylic acid terpolymers and low carboxylic acid terpolymers may be utilized to provide compositions for use in the invention.

Referring now to the drawings, and first to FIG. 1, a golf ball 10 including a core 12 and a cover 14 comprising glass particles is shown.

Figure 2:
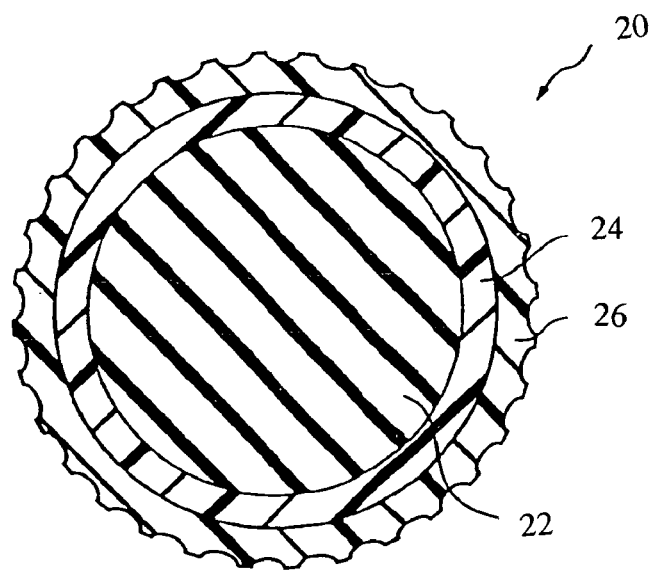
FIG. 2 shows a multi-layered ball with a cover comprising surface treated glass particles.

FIG. 2 shows a multi-layered golf ball 20 having a core 22, an intermediate layer (or mantle layer) 24, and a cover 26, wherein at least one of the mantle or cover layers comprises glass particles.

Although the compositions employed in the invention may be used in golf ball construction including solid cores, one-piece balls and covers, these compositions are preferably employed as mantle and/or cover layers. Golf ball mantle and cover layers can be produced by any method known in the art, such as injection molding, reaction injection molding or compression molding the compositions containing glass particles employed herein over a wound or solid molded core, or a liquid core to produce a golf ball having a diameter of about 1.680 inches or greater and weighing about 1.620 ounces. In golf balls comprising multi-layered covers, any of the mantle and/or cover layers may comprise the glass particle containing compositions employed herein.

The core itself may be of a uniform composition, or may have two or more layers. The standards for both the diameter and weight for golf balls are established by the United States Golf Association (U.S.G.A.). Although the compositions employed in the invention can be used in solid core, two-piece and wound balls, solid and two-piece balls are preferred over wound balls due to their lower cost and superior performance. The term "solid cores" as used herein refers not only to one piece cores but also to multi-layer cores.

The cores of the inventive golf balls typically have a coefficient of restitution of about 0.770 or more and a PGA compression of about 60 or more, and more preferably about 80 or more. The core used in the golf ball of the invention preferably is a solid. The cores generally have a weight of 25 to 40 grams and preferably 30 to 40 grams, although other sizes may be used if desired. When the golf ball of the invention has a solid core, this core can be compression molded from a slug of uncured or lightly cured elastomer composition comprising a high cis content polybutadiene and a metal salt of an alpha, beta, ethylenically unsaturated carboxylic acid such as zinc mono- or diacrylate or methacrylate. Any known elastomer composition known in the art may be used. To achieve higher coefficients of restitution and/or to increase hardness in the core, the manufacturer may include a small amount of a metal oxide such as zinc oxide. In addition, larger amounts of metal oxide than are needed to achieve the desired coefficient may be included in order to increase the core weight so that the finished ball more closely approaches the U.S.G.A. upper weight limit of 1.620 ounces. Non-limiting examples of other materials which may be used in the core composition including compatible rubbers or ionomers, and low molecular weight fatty acids such as stearic acid. Free radical initiator catalysts such as one more peroxides are admixed with the core composition so that on the application of heat and pressure, a curing or cross-linking reaction takes place. Additional materials that may be added to the core include, but are not limited to, organic and inorganic sulfur compounds; peptizers (such as pentachlorothiophenol or zinc pentachlorothiophenol); high efficiency, heavy fillers (such as tungsten, zinc, bismuth, and the like).

A thread wound core may comprise a liquid, solid, gel or multi-piece center. The thread wound core is typically obtained by winding a thread of natural or synthetic rubber, or thermoplastic or thermosetting elastomer such as polyurethane, polyester, polyamide, etc. on a solid, liquid, gel or gas filled center to form a thread rubber layer that is then covered with one or more mantle or cover layers. Additionally, prior to applying the cover layers, the thread wound core may be further treated or coated with an adhesive layer, protective layer, or any substance that may improve the integrity of the wound core during application of the cover layers and ultimately in usage as a golf ball. Since the core material is not an integral part of the present invention, further detailed discussion concerning the specific types of core materials which may be utilized with the cover compositions of the invention are not specifically set forth herein. Since the core material is not an integral part of the present invention, a detailed discussion concerning the specific types of core materials which may be utilized with the cover compositions of the invention are not specifically set forth herein.

Golf balls of the invention may be produced by forming covers which include compositions of the invention around cores by conventional molding processes. The cover material is mixed in a rigorous mixing procedure, preferably using a twin screw extruder or the like and an extrusion temperature of about 200□ C. to 300□ C. The cover compositions may be injection molded directly around the core while the core is positioned in the center of a golf ball mold at a temperature of about 350□ F. up to about 500□ F. In compression molding, the cover composition is first injection molded at about 380□ F. to about 450□ F. to provide smooth surfaced hemispherical shells. The shells are then positioned around the core in a dimpled golf ball mold and compression molded at about 230 to about 300□ F. for about 2 minutes to about 10 minutes at a pressure sufficient to retain the mold in a closed position. Thereafter, the mold is cooled at about 50□ F. to about 70□ F. for about 2 minutes to about 10 minutes to fuse the shells together to form a unitary ball. After molding, the resulting golf balls may undergo various further processing steps such as buffing, painting and marking.

The present invention is further illustrated by the following non-limiting examples set forth below. In Table 3, which includes data for the examples, the compositions are injection molded at about 500□ F. around solid cores having a diameter of about 1.508" to produce intermediate golf balls about 1.59" in diameter. A cover layer is then molded over the intermediate golf ball. The properties for the balls listed in the examples are measured according to the following procedures:

The resilience or coefficient of restitution (C.O.R.) of a golf ball is the constant "e," which is the ratio of the relative velocity of an elastic sphere after direct impact to that before impact. As a result, the C.O.R. ("e") can vary from 0 to 1, with 1 being equivalent to a perfectly or completely elastic collision and 0 being equivalent to a perfectly or completely inelastic collision.

C.O.R., along with additional factors such as club head speed, club head mass, ball weight, ball size and density, spin rate, angle of trajectory and surface configuration (for example, dimple pattern and area of dimple coverage) as well as environmental conditions (for example, temperature, moisture, atmospheric pressure, wind, etc.) generally determine the distance a ball will travel when hit. Along this line, the distance a golf ball will travel under controlled environmental conditions is a function of the speed and mass of the club and size, density and resilience (C.O.R.) of the ball and other factors. The initial velocity of the club, the mass of the club and the angle of the ball's departure are essentially provided by the golfer upon striking. Since club head, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the coefficient of restitution (C.O.R.) and the surface configuration (dimple pattern, ratio of land area to dimple area, etc.) of the ball.

The C.O.R. in solid core balls is a function of the composition of the molded core and of the cover. The molded core and/or cover may be comprised of one or more layers such as in multi-layered balls. In balls containing a wound core (i.e., balls comprising a liquid or solid center, elastic windings, and a cover), the coefficient of restitution is a function of not only the composition of the center and cover, but also the composition and tension of the elastomeric windings. As in the solid core balls, the center and cover of a wound core ball may also consist of one or more layers.

The coefficient of restitution is the ratio of the outgoing velocity to the incoming velocity. In the examples of this application, the coefficient of restitution of a golf ball was measured by propelling a ball horizontally at a speed of 125 5 feet per second (fps) and corrected to 125 fps against a generally vertical, hard, flat steel plate and measuring the ball's incoming and outgoing velocity electronically. Speeds were measured with a pair of Oehler Mark 55 ballistic screens available from Oehler Research, Inc., P.O. Box 9135, Austin, Tex., which provide a timing pulse when an object passes through them. The screens were separated by 36" and are located 25.25" and 61.25" from the rebound wall. The ball speed was measured by timing the pulses from screen 1 to screen 2 on the way into the rebound wall (as the average speed of the ball over 36"), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel 2.5 inches thick and 24 inches square.

As indicated above, the incoming speed should be 125 5 fps but corrected to 125 fps. The correlation between C.O.R. and forward or incoming speed has been studied and a correction has been made over the 5 fps range so that the C.O.R. is reported as if the ball had an incoming speed of exactly 125.0 fps.

The coefficient of restitution must be carefully controlled in all commercial golf balls if the ball is to be within the specifications regulated by the United States Golf Association (U.S.G.A.). As mentioned to some degree above, the U.S.G.A. standards indicate that a "regulation" ball cannot have an initial velocity exceeding 255 feet per second in an atmosphere of 75□ F. when tested on a U.S.G.A. machine. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

The term "compression" utilized in the golf ball trade generally defines the overall deflection that a golf ball undergoes when subjected to a compressive load. For example, PGA compression indicates the amount of change in golf ball's shape upon striking. The development of solid core technology in two-piece balls has allowed for much more precise control of compression in comparison to thread wound three-piece balls. This is because in the manufacture of solid core balls, the amount of deflection or deformation is precisely controlled by the chemical formula used in making the cores. This differs from wound three-piece balls wherein compression is controlled in part by the winding process of the elastic thread. Thus, two-piece and multilayer solid core balls exhibit much more consistent compression readings than balls having wound cores such as the thread wound three-piece balls.

In the past, PGA compression related to a scale of from 0 to 200 given to a golf ball. The lower the PGA compression value, the softer the feel of the ball upon striking. In practice, tournament quality balls have compression ratings around 70 to 110, preferably around 80 to 100.

In determining PGA compression using the 0 to 200 scale, a standard force is applied to the external surface of the ball. A ball which exhibits no deflection (0.0 inches in deflection) is rated 200 and a ball which deflects 2/10th of an inch (0.2 inches) is rated 0. Every change of 0.001 of an inch in deflection represents a 1 point drop in compression. Consequently, a ball which deflects 0.1 inches (100×0.001 inches) has a PGA compression value of 100 (for example, 200–100) and a ball which deflects 0.110 inches (110×0.001 inches) has a PGA compression of 90 (for example, 200–110).

In order to assist in the determination of compression, several devices have been employed by the industry. For example, PGA compression is determined by an apparatus fashioned in the form of a small press with an upper and lower anvil. The upper anvil is at rest against a 200-pound die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 80 to 100 which means that the upper anvil was deflected a total of 0.120 to 0.100 inches.

An example to determine PGA compression can be shown by utilizing a golf ball compression tester produced by Atti Engineering Corporation of Newark, N.J. The value obtained by this tester relates to an arbitrary value expressed by a number which may range from 0 to 100, although a value of 200 can be measured as indicated by two revolutions of the dial indicator on the apparatus. The value obtained defines the deflection that a golf ball undergoes when subjected to compressive loading. The Atti test apparatus consists of a lower movable platform and an upper movable spring-loaded anvil. The dial indicator is mounted such that it measures the upward movement of the spring-loaded anvil. The golf ball to be tested is placed in the lower platform, which is then raised a fixed distance. The upper portion of the golf ball comes in contact with and exerts a pressure on the springloaded anvil. Depending upon the distance of the golf ball to be compressed, the upper anvil is forced upward against the spring.

Several good alternative devices have also been employed to determine compression. For example, Applicant also utilizes an Instron® 5544 (manufactured by Instron Corporation, Canton, Mass.) to test compression. Using the INSTRON® tester, compression is measured by determining the deflection caused by a 200 lb. load applied at the rate of 15 kips (thousand pounds of force per second).

Additional compression devices may also be utilized to monitor golf ball compression so long as the correlation to PGA compression is known. These devices have been designed, such as a Whitney Tester, to correlate or correspond to PGA compression through a set relationship or formula. Another compression device which has been utilized in the past by Applicant is a modified Riehle Compression Machine originally produced by Riehle Bros. Testing Machine Company, Philadelphia, Pa. to evaluate compression of the various components (i.e., cores, mantle cover balls, finished balls, etc.) of the golf balls. The Riehle compression device determines deformation in thousandths of an inch under a load designed to emulate the 200 pound spring constant of the Atti or PGA compression testers. Using such a device, a Riehle compression of 61 corresponds to a deflection under load of 0.061 inches.

Additionally, an approximate relationship between Riehle compression and PGA compression exists for balls of the same size. It has been determined by Applicant that Riehle compression corresponds to PGA compression by the general formula PGA compression=160–Riehle compression. Consequently, 80 Riehle compression corresponds to 80 PGA compression, 70 Riehle compression corresponds to 90 PGA compression, and 60 Riehle compression corresponds to 100 PGA compression. For reporting purposes, Applicant's compression values were measured as Riehle compression and converted to PGA compression.

To measure the durability, finished golf balls were fired at 155 ft/second against a 2" thick steel plate. The durability specification is no breaks below 20 blows.

EXAMPLES

Various mantle compositions were produced using a blend of ionomers and glass particles. The mantle compositions are shown in Table 1 below. The compositions were then injection molded around cores to yield intermediate golf balls approximately 1.59 inches in diameter. The cores used in the examples were standard cores having a PGA compression of about 40 to 45 and a COR of about 0.76 to 0.77. A cover was then molded on the intermediate balls as described above. Control balls having a mantle layer of the same ionomer blend without glass particles were also produced. The balls were then tested for various properties. The results are shown below in Table 3.

Examples 2 and 3 in Tables 1 and 3 illustrate golf balls formed with mantle layer compositions that include glass particles. Example 1 is the control sample using the same ionomer blend except that here are no glass particles in the composition.

TABLE 1

| Component (phr) | 1 | 2 | 3 |
|---|---|---|---|
| Surlyn ® 8140 | 50 | 50 | 50 |
| Surlyn ® 9150 | 25 | 25 | 25 |
| Surlyn ® 6120 | 25 | 25 | 25 |
| Microglas REV-4[1] | — | 5 | — |
| Aminosilane REF-015A glass flake[2] | — | — | 5 |

[1]Microglas REV-4 is a milled glass fiber having a fiber diameter of about 13 microns and a fiber length of about 70 microns, and REV-4 is untreated.
[2]Aminosilane REF-015A glass flake is an aminosilane treated microglas flake.

Other glass flakes and properties are shown below in Table 2.

TABLE 2

| Type | | Non-Surface Treatment | | | Surface Treatment | |
|---|---|---|---|---|---|---|
| Product Code | | REF-600 | REF-160 | REF-015 | REF-160T | REF-160N |
| Glass Composition | | | | E-Glass | | |
| Specific Gravity | | | | 2.5 | | |
| Thickness (μm) | | | | Average 5 ± 2 | | |
| Particle | >1700 μm | 0 | 0 | 0 | 0 | 0 |
| Size | 1700~300 | 80 or more | 10 or less | 12 or less | 10 or less | 10 or less |
| Distribution | 300~150 | | 65 or more | | 65 or more | 65 or more |
| | 150~45 | 20 or less | | | | |
| | <45 μm | | 25 or less | 88 or more | 25 or less | 25 or less |
| Loss on Ignition (%) | | — | | | 0.15 ± 0.10 | 0.15 ± 0.10 |
| Surface Treatment Agent | | — | | | Epoxysilane | Acrylsilane |

TABLE 3

| | Example | | |
|---|---|---|---|
| | 1 | 2 | 3 |
| Size (in) | 1.684 | 1.685 | 1.684 |
| Weight (grams) | 45.78 | 45.95 | 45.93 |
| Riehle Compression | 79 | 78 | 76 |
| PGA Compression (calculated) | 81 | 82 | 84 |
| COR | 0.8031 | 0.8024 | 0.8040 |
| High Speed Durability (average) | 119 | 122 | 137 |
| First Break | 42, 62, 81 | 75 | 89 |

As shown by the results in Table 3, the addition of glass particles to the mantle composition of a golf ball results in a more durable golf ball than the golf ball without glass particles in the mantle layer. The golf ball having a mantle layer comprising treated glass particles produced the most durable golf ball.

In any of the compositions employed in the invention, additional materials may be added to these compositions employed to provide desired properties. These materials include, for example, dyes such as ULTRAMARINE BLUE™ sold by Wittaker, Clark and Daniels of South Plainfield, N.J., titanium dioxide, UV absorbers and stabilizers.

In addition to the above noted materials, compatible additive materials may also be added to produce the cover compositions of the present invention. These additive materials include dyes (for example, ULTRAMARINE BLUE™ sold by Whitaker, Clark, and Daniels of South Plainsfield, N.J.), and pigments, i.e., white pigments such as titanium dioxide (for example UNITANE™ 0–110) zinc oxide, and zinc sulfate, as well as fluorescent pigments. As indicated in U.S. Pat. No. 4,884,814, the amount of pigment and/or dye used in conjunction with the polymeric cover composition depends on the particular base resin mixture utilized and the particular pigment and/or dye utilized. The concentration of the pigment in the polymeric cover composition can be from about 1% to about 10% as based on the weight of the base resin mixture. A more preferred range is from about 1% to about 5% as based on the weight of the base resin mixture. The most preferred range is from about 1% to about 3% as based on the weight of the base resin mixture. The most preferred pigment for use in accordance with this invention is titanium dioxide.

Moreover, since there are various hues of white, i.e., blue white, yellow white, etc., trace amounts of blue pigment may be added to the cover stock composition to impart a blue white appearance thereto. However, if different hues of the color white are desired, different pigments can be added to the cover composition at the amounts necessary to produce the color desired.

In addition, it is within the purview of this invention to add to the cover compositions of this invention compatible materials that do not affect the basic novel characteristics of the composition of this invention. Among such materials are antioxidants (such as SANTONOX®, 4,4'-di(1,1,3,3-tetramethylbutyl)diphenylamine sold under the trade designation "Octamine Antioxidant" by Naugatuck Division of US Rubber. Also useful is the hydroperoxide decomposer antidegradant tetrakis(2,4-ditertbutylphenyl)-4,4'-biphenylenediphosphonite sold under the trade designation "SANDOSTAB P-EPQ" by Sandoz Colors & Chemicals Co.), antistatic agents, stabilizers and processing aids. The cover compositions of the present invention may also contain softening agents, such as plasticizers, etc., and reinforcing materials such as glass fibers and inorganic fillers, as long as the desired properties produced by the golf ball covers of the invention are not impaired.

Furthermore, optical brighteners, such as those disclosed in U.S. Pat. No. 4,679,795, herein incorporated by reference, may also be included in the cover composition of the invention. Examples of suitable optical brighteners which can be used in accordance with this invention are UVITEX® OB as sold by the Ciba-Geigy Chemical Company, Ardsley, N.Y. UVITEX® OB is thought to be 2,5-Bis(5-tert-butyl-2-benzoxazoly)thiophene. Examples of other optical brighteners suitable for use in accordance with this invention are as follows: LEUCOPURE® EGM as sold by Sandoz, East Hanover, N.J. 07936. LEUCOPURE® EGM is thought to be 7-(2n-naphthol(1,2-d)-triazol 2yl)-3phenyl-coumarin. PHORWHITE® K-20G2 is sold by Mobay Chemical Corporation, P.O. Box 385, Union Metro Park, Union, N.J. 07083, and is thought to be a pyrazoline derivative, EASTOBRITE® OB-1 as sold by Eastman Chemical Products, Inc. Kingsport, Tenn., is thought to be 4,4-Bis(-benzoxaczoly)stilbene. The above-mentioned UVITEX® and EASTOBRITE® OB-1 are preferred optical brighteners for use in accordance with this invention.

Moreover, since many optical brighteners are colored, the percentage of optical brighteners utilized must not be excessive in order to prevent the optical brightener from functioning as a pigment or dye in its own right.

The compositions employed in the invention may be prepared by any conventional procedure that provides a substantially uniform admixture of the components. Preferably drying and melt blending procedures and equipment are used. For example, in preparation of compositions which employ glass particles with one or more terpolymers and/or terpolymer ionomers, the terpolymer and/or terpolymer ionomer can be dry mixed with the glass particles, typically at room temperature, and the resulting mixture melt blended in any conventional type blending equipment heated to about 200 to 250° C. The glass particles and the copolymer, terpolymer, terpolymer ionomer, and/or copolymer ionomer preferably are dried (either individually or together) before melt blending. Drying is done in desiccated air at a temperature and for a time suitable to reduce the moisture content to a point which it will not have any adverse effect on the subsequent use of the compositions or the properties of the resulting product. If additives such as those identified above have not previously been added to either the glass particles, the copolymer or copolymer ionomer during processing of those individual components (before they are admixed with each other), the additives may be added during melt blending of those components. The uniform admixture resulting from the melt blending procedure then may be commuted by chopping, pelletizing or grinding into granules, pellets, chips, flakes or powders suitable for subsequent use, for example, injection molding to provide a golf ball.

The invention has been described with reference to the preferred embodiments. Modification and alterations will occur to others upon reading and understanding the preceding detailed description. It is intended that the invention be construed as including all such alterations and modifications insofar as they come within the scope of the claims and the equivalents thereof.

The invention claimed is:

1. A golf ball having improved durability, the golf ball comprising:
   a core;
   a cover disposed on the core; and
   at least one cover layer disposed on the mantle, wherein at least one of the mantle and cover layers comprises a composition comprising a mixture of glass particles and an ionomeric or non-ionomeric material, the glass particles comprising surface treated glass particles comprising an aminosilane surface treatment.

2. The golf ball of claim 1, wherein the composition comprises from about 0.5 to about 40 percent glass particles.

3. The golf ball of claim 1, wherein the glass particles comprise glass flakes.

4. The golf ball of claim 1, wherein the glass particles comprise glass fibers.

5. The golf ball of claim 1, wherein the glass particles are metal coated.

* * * * *